(12) United States Patent
Yang et al.

(10) Patent No.: US 10,219,257 B2
(45) Date of Patent: Feb. 26, 2019

(54) METHOD AND DEVICE FOR TRANSMITTING UPLINK CONTROL INFORMATION

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/315,611

(22) PCT Filed: Jun. 17, 2015

(86) PCT No.: PCT/KR2015/006132
§ 371 (c)(1),
(2) Date: Dec. 1, 2016

(87) PCT Pub. No.: WO2015/194849
PCT Pub. Date: Dec. 23, 2015

(65) Prior Publication Data
US 2017/0208581 A1 Jul. 20, 2017

Related U.S. Application Data

(60) Provisional application No. 62/013,533, filed on Jun. 17, 2014.

(51) Int. Cl.
*H04W 72/04* (2009.01)
*H04W 56/00* (2009.01)
(Continued)

(52) U.S. Cl.
CPC ....... *H04W 72/0413* (2013.01); *H04L 5/0048* (2013.01); *H04L 5/0055* (2013.01);
(Continued)

(58) Field of Classification Search
CPC ......... H04W 72/0413; H04W 28/0278; H04W 72/0446; H04W 72/14; H04L 5/0048; H04L 5/0055; H04L 5/0057
See application file for complete search history.

(56) References Cited

U.S. PATENT DOCUMENTS

| 2013/0188473 A1* | 7/2013 | Dinan | H04W 56/0005 370/216 |
| 2014/0056278 A1* | 2/2014 | Marinier | H04W 72/044 370/330 |
| 2014/0119302 A1 | 5/2014 | Ahn et al. | |

FOREIGN PATENT DOCUMENTS

| WO | WO 2011/132993 A2 | 10/2011 |
| WO | WO 2013/168917 A1 | 11/2013 |
| WO | WO 2014/031998 A1 | 2/2014 |

OTHER PUBLICATIONS

Huawei et al., "Physical Layer Impact of Dual Connectivity—Uplink," 3GPP TSG RAN WG1 Meeting #76, R1-140044, Prague, Czech Republic, Feb. 10-14, 2014, 5 pages.

* cited by examiner

*Primary Examiner* — Kiet Tang
(74) *Attorney, Agent, or Firm* — Birch, Stewart, Kolasch & Birch, LLP

(57) ABSTRACT

The present invention relates to a method and a device for transmitting uplink control information in a wireless communication system supporting carrier merging of a plurality of cells comprising a first cell and a second cell, the method comprising the steps of: receiving a first uplink grant from a base station by means of a random access response; the first uplink grant scheduling first physical uplink shared channel (PUSCH) transmission on a first cell and receiving a second uplink grant from the base station by means of a physical downlink control channel (PDCCH); and the second uplink grant scheduling a second PUSCH transmission (Continued)

on a second cell and, if the first PUSCH transmission and the second PUSCH transmission are configured in the same subframe, transmitting uplink control information to the base station on the second cell by means of a second PUSCH, wherein the first PUSCH transmission scheduled on the first cell is dropped.

16 Claims, 17 Drawing Sheets

(51) Int. Cl.
*H04W 72/14* (2009.01)
*H04L 5/00* (2006.01)
*H04W 72/12* (2009.01)
*H04W 28/02* (2009.01)
*H04B 7/06* (2006.01)

(52) U.S. Cl.
CPC .......... *H04L 5/0057* (2013.01); *H04L 5/0096* (2013.01); *H04W 72/0446* (2013.01); *H04W 72/1278* (2013.01); *H04W 72/14* (2013.01); *H04B 7/063* (2013.01); *H04B 7/0632* (2013.01); *H04B 7/0639* (2013.01); *H04L 5/001* (2013.01); *H04L 5/0053* (2013.01); *H04W 28/0236* (2013.01); *H04W 28/0278* (2013.01)

METHOD AND DEVICE FOR TRANSMITTING UPLINK CONTROL INFORMATION

CROSS REFERENCE TO RELATED APPLICATIONS

This application is the National Phase of PCT/KR2015/006132 filed on Jun. 17, 2015, which claims priority under 35 U.S.C. § 119(e) to U.S. Provisional Application No. 62/013,533 filed on Jun. 17, 2014, all of which are hereby expressly incorporated by reference into the present application.

TECHNICAL FIELD

The present invention relates to a wireless communication system. More specifically, the present invention relates to a method and apparatus for transmitting uplink control information in a wireless communication system.

BACKGROUND ART

Wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

An object of the present invention is to provide a method for efficiently transmitting uplink control information in a wireless communication system and an apparatus therefor.

Another object of the present invention is to provide a method for efficiently performing a random access procedure in a wireless communication system and an apparatus therefor.

The other object of the present invention is to provide a method for preventing problems caused by discordance of information transceived between a UE and a base station in a random access procedure in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, provided herein is a method for transmitting uplink control information by a user equipment in a wireless communication system supporting carrier aggregation of a plurality of cells containing a first cell and a second cell, the method comprising: receiving a first uplink grant via a random access response from a base station, wherein the first uplink grant schedules a first PUSCH (physical uplink shared channel) transmission on the first cell; receiving a second uplink grant via a PDCCH (physical downlink control channel) from the base station, wherein the second uplink grant schedules a second PUSCH transmission on the second cell; and when the first PUSCH transmission and the second PUSCH transmission are configured in the same subframe, transmitting the uplink control information to the base station on the second cell via the second PUSCH, wherein the first PUSCH transmission scheduled on the first cell is dropped.

In another aspect of the present invention, provided herein is a user equipment configured to transmit uplink control information to a base station in a wireless communication system supporting carrier aggregation of a plurality of cells containing a first cell and a second cell, the user equipment comprising: a RF (radio frequency) unit configured to transmit and receive a signal; and a processor operably connected to the RF unit and configured to: control the RF unit to receive a first uplink grant via a random access response from a base station, wherein the first uplink grant schedules a first PUSCH (physical uplink shared channel) transmission on the first cell, control the RF unit to receive a second uplink grant via a PDCCH (physical downlink control channel) from the base station, wherein the second uplink grant schedules a second PUSCH transmission on the second cell, when the first PUSCH transmission and the second PUSCH transmission are configured in the same subframe, control the RF unit to transmit the uplink control information to the base station on the second cell via the second PUSCH, wherein the first PUSCH transmission scheduled on the first cell is dropped.

Preferably, when a SRS (sounding reference signal) transmission is configured in the specific subframe, a rate-matching may be applied to the second PUSCH.

Preferably, the uplink control information may comprise channel state information (CSI), and the CSI may comprise at least one of channel quality indication information, precoding matrix indication information, or rank indication information.

Preferably, when a HARQ-ACK (Hybrid Automatic Repeat and reQuest Acknowledgement/Negative-ACK) transmission is configured in the specific subframe and a simultaneous transmission of PUCCH (Physical Uplink Control Channel) and PUSCH is not configured in the specific subframe, the HARQ-ACK may be transmitted via the second PUSCH, and when the HARQ-ACK transmission is configured in the specific subframe and the simultaneous transmission of PUCCH and PUSCH is configured in the specific subframe, the HARQ-ACK may be transmitted via a PUCCH on the first cell.

Preferably, the random access response may be received in response to a random access preamble which is transmitted to the base station by the user equipment in a contention-based random access procedure.

Preferably, the plurality of cells may belong to a single timing advance group (TAG).

Preferably, the method further comprises: transmitting a buffer status report (BSR) via the second PUSCH, the BSR indicating an uplink data buffer status of the user equipment.

Preferably, the first cell is a primary cell (Pcell) and the second cell is a secondary cell (Scell).

Advantageous Effects

According to the present invention, it is able to efficiently transmit uplink control information in a wireless communication system.

According to the present invention, it is able to efficiently perform a random access procedure in a wireless communication system.

According to the present invention, it is able to prevent problems caused by discordance of information transceived between a UE and a base station in a random access procedure in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a UE may receive information from a BS in downlink (DL) and transmit information in uplink (UL). The information transmitted or received by the UE may include data and various control information. In addition, there are various physical channels according to the type or use of the information transmitted or received by the UE.

In the present invention, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, a BS may be interchangeably referred to as an eNB.

Figure 1:
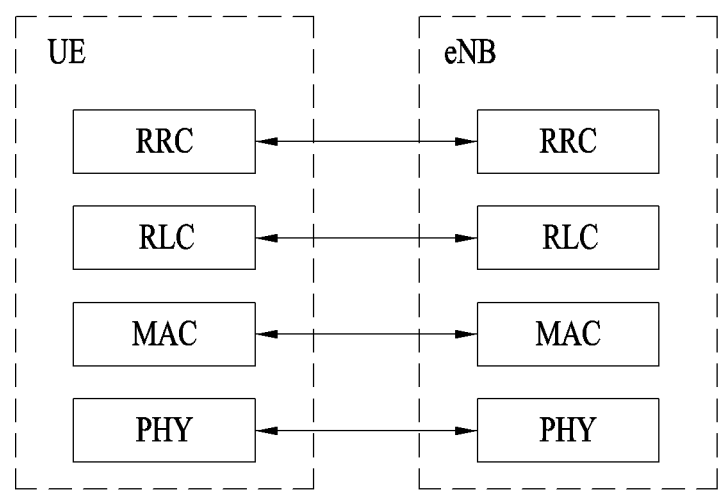
FIG. 1 illustrates layers of a radio protocol.

FIG. 1 illustrates layers of a radio protocol.

The physical layer (PHY) which is a first layer provides information transfer services to the upper layers using a physical channel. The PHY layer is connected to the upper medium access control (MAC) layer through a transport channel, and data between the MAC layer and the PHY layer is transferred through the transport channel. In this case, the transport channel is roughly divided into a dedicated transport channel and a common transport channel based on whether or not the channel is shared. Furthermore, data is transferred between different PHY layers, i.e., between PHY layers at transmitter and receiver sides.

A second layer may include various layers. The medium access control (MAC) layer serves to map various logical channels to various transport channels, and also performs logical channel multiplexing for mapping several logical channels to one transport channel. The MAC layer is connected to a radio link control (RLC) layer, which is an upper layer, through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A radio resource control (RRC) layer located at the uppermost portion of a third layer is only defined in the control plane. The RRC layer performs a role of controlling logical channels, transport channels, and physical channels in relation to configuration, re-configuration, and release of radio bearers. Here, the radio bearer denotes a logical path provided by the first and the second layers for transferring data between the UE and the UTRAN. In general, the configuration of the radio bearer refers to a process of stipulating the characteristics of protocol layers and channels required for providing a specific service, and setting each of the detailed parameter and operation methods thereof. The radio bearer is divided into a signaling radio bearer (SRB) and a data radio bearer (DRB), wherein the SRB is used as a path for transmitting RRC messages in the control plane while the DRB is used as a path for transmitting user data in the user plane.

In a wireless access system, a user equipment (UE) may receive information from a base station (BS) in downlink (DL) and transmit information in uplink (UL). The information transmitted or received by the UE may include general data information and various control information. In addition, there are various physical channels according to the type or use of the information transmitted or received by the UE.

Figure 2:
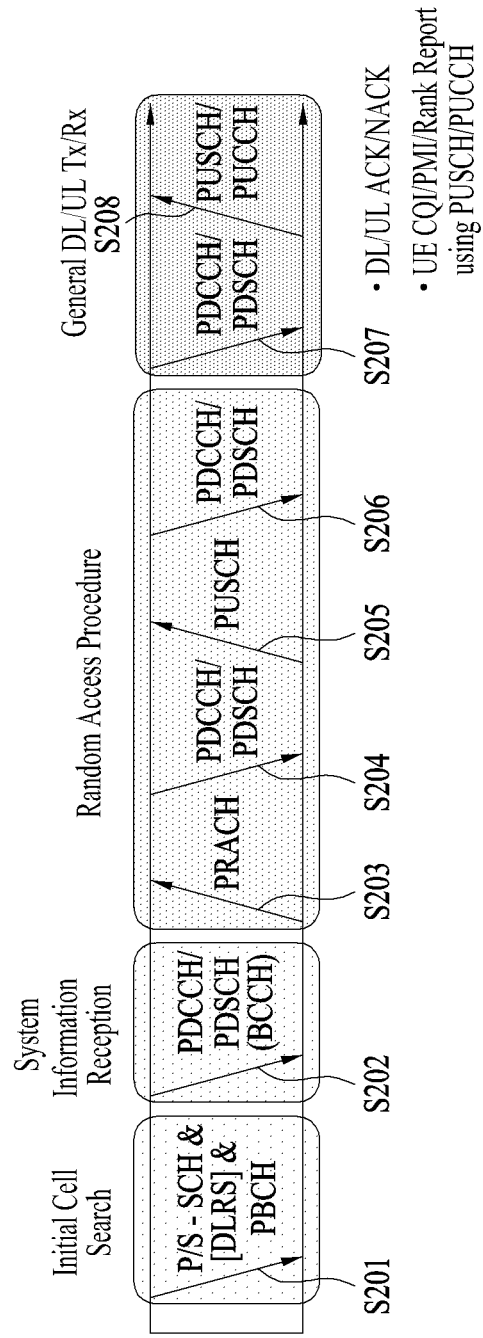
FIG. 2 illustrates physical channels and a general method for transmitting signals on the physical channels in the LTE(-A) system.

FIG. 2 illustrates physical channels and a general method for transmitting signals on the physical channels in the LTE(-A) system.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization channel (P-SCH) and a secondary synchronization channel (S-SCH) from the base station. Then the UE may acquire broadcast information in the cell by receiving a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of a physical uplink shared channel (PUSCH) (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is referred to as Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and data should be transmitted simultaneously, they may be transmitted on a PUSCH. In addition, the UCI may be transmitted aperiodically on the PUSCH, upon receipt of a request/command from a network.

Figure 3:
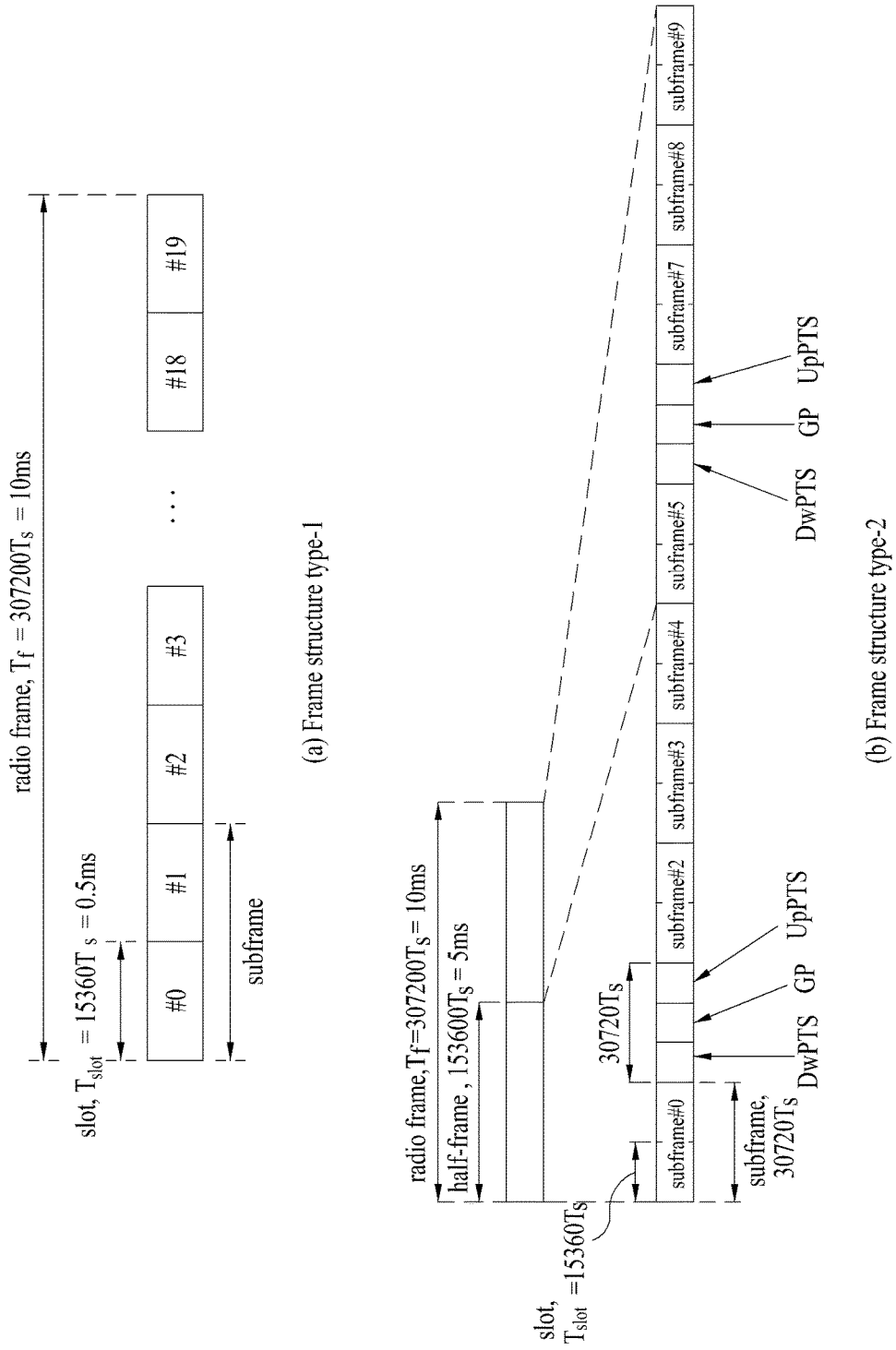
FIG. 3 illustrates a structure of a radio frame used in the LTE(-A) system.

FIG. 3 illustrates a structure of a radio frame used in the LTE(-A) system. In a cellular OFDM radio packet communication system, uplink/downlink data packet transmission is performed in the unit of a subframe (SF), and one subframe is defined as a predetermined duration including a plurality of OFDM symbols. The LTE(-A) system supports a type-1 radio frame structure applicable to frequency division duplex (FDD) and a type-2 radio frame structure applicable to time division duplex (TDD).

FIG. 3($a$) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol duration. In the LTE(-A) system, since SC-FDMA is used in uplink, an OFDM symbol may be referred to as an SC-FDMA symbol in the present specification, and also may be collectively referred to as a symbol duration. A resource block (RB) as a resource assignment unit may include a plurality of consecutive subcarriers in one slot.

The length of one symbol duration (or the number of OFDM symbols included in one slot) may vary according to a configuration of cyclic prefix (CP). The cyclic prefix refers to repeating a portion of symbol (e.g. the last portion of symbol) or the entire symbol and placing the repeated portion in front of the symbol. The cyclic prefix is used to remove inter-symbol interferences or facilitate a channel measurement of frequency-selective multi-path channel. The cyclic prefix includes an extended CP and a normal CP. For example, if OFDM symbols are configured by the normal CP, the number of OFDM symbols included in one slot may be 7. In case of the extended CP, for example, the number of OFDM symbols included in one slot may be 6.

FIG. 3($b$) illustrates a structure of the type-2 radio frame. The type-2 radio frame includes two half frames, and each half frame includes five subframes, a downlink period (e.g. a downlink pilot time slot or DwPTS), a guard period (GP) and an uplink period (e.g. an uplink pilot time slot or UpPTS). One subframe includes two slots. For example, The downlink period (e.g., DwPTS) is used for initial cell search, synchronization or channel estimation of a UE. For example, the uplink period (e.g., UpPTS) is used for channel estimation of a BS and uplink transmission synchronization of a UE. For example, the uplink period (e.g., UpPTS) may be used to transmit a sounding reference signal (SRS) for channel estimation in a base station and to transmit a physical random access channel (PRACH) that carriers a random access preamble for uplink transmission synchronization. The guard period is used to eliminate interference generated in uplink due to multi-path delay of a downlink signal between uplink and downlink. Table 1 shows an example of an uplink-downlink (UL-DL) configuration of subframes within a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), U represents an uplink subframe (UL SF), and S represents a special subframe. The special subframe includes a downlink period (e.g. DwPTS), a guard period (e.g. GP), and an uplink period (e.g. UpPTS). Table 2 shows an example of a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is exemplary. Thus, the number of subframes in a radio frame, the number of slots in a subframe, or the number of symbols in a slot may be modified in various ways.

Figure 4:
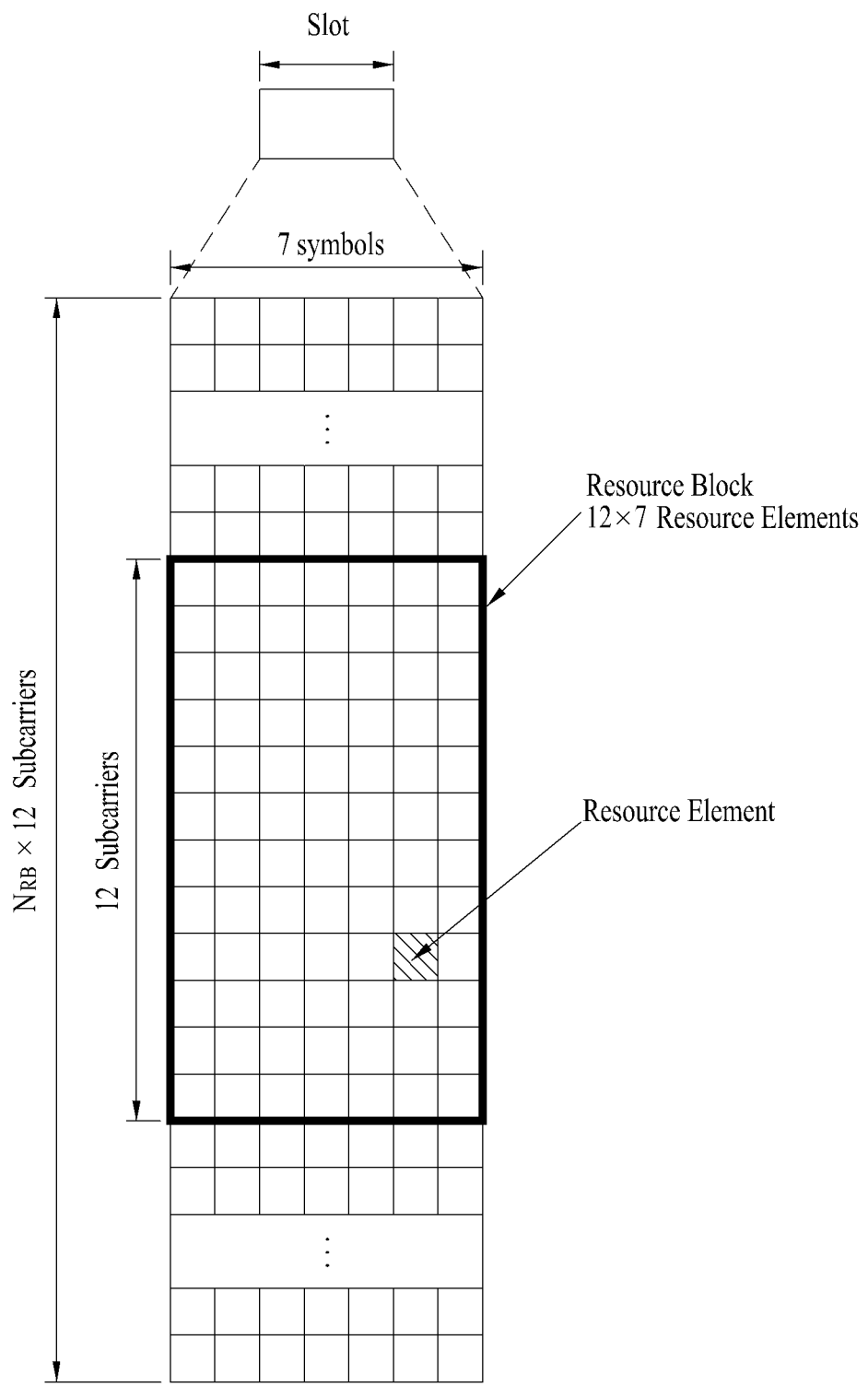
FIG. 4 illustrates a resource grid of one downlink slot.

FIG. 4 illustrates a resource grid of one downlink slot.

Referring to FIG. 4, a downlink slot includes a plurality of OFDM symbols in the time domain. One downlink slot may include 7 OFDM symbols and one resource block (RB) may include 12 subcarriers in the frequency domain. An example as illustrated in FIG. 4 may be applied to a normal CP case, while one downlink slot may include 6 OFDM symbols in the time domain in case of an extended CP case. Each element of the resource grid is referred to as a Resource Element (RE). An RB includes 12×7 REs. The number of RBs in a downlink slot, $N_{DL}$ depends on a downlink transmission bandwidth. The structure of an uplink slot may have the same structure as a downlink slot.

Figure 5:
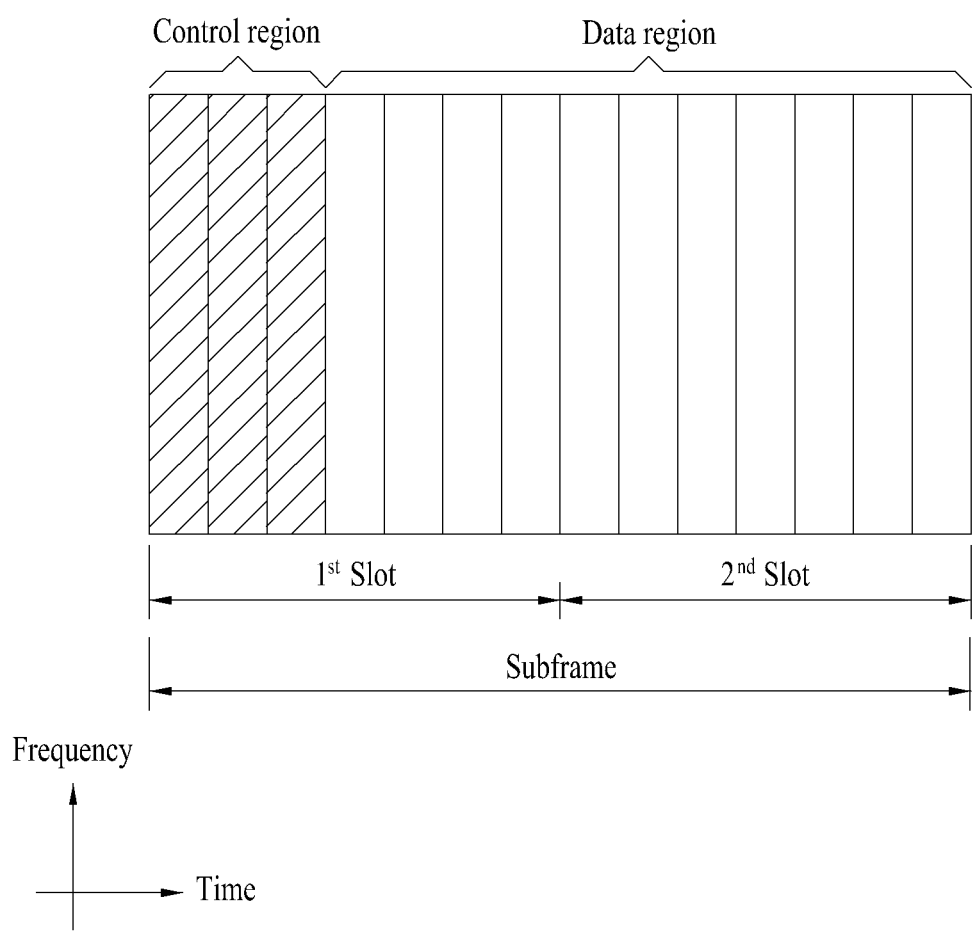
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first OFDM symbol of a subframe and carries information regarding the number of OFDM symbols used for transmission of control channels within the subframe. The PCFICH is composed of four resource element groups (REGs) each of which is uniformly distributed in a control region based on a cell ID. The PCFICH indicates a value of 1 to 3 (or 2 to 4) and is modulated using quadrature phase shift keying (QPSK).

PDCCH carries a transmission format or resource allocation information of downlink shared channel (DL-SCH), a transmission format or resource allocation information of uplink shared channel (UL-SCH), paging information on paging channel (PCH), system information on DL-SCH, resource allocation information of an upper layer control message such as random access response transmitted on PDSCH, a set of Tx power control commands for individual UEs within a UE group, Tx power control command, activation indication information of Voice over IP (VoIP), etc.

The LTE(-A) system defines a limited set of CCE positions in which a PDCCH is to be positioned for each UE. The limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, if a CRC error is not detected when the PDCCH is de-masked using the C-RNTI, the UE has detected its own PDCCH. The UE-specific search space (USS) is separately configured for each UE and a scope of common search space (CSS) is known to all UEs.

PHICH carries an HARQ ACK/NACK signal in response to uplink transmission. The PHICH is allocated to remaining REGs other than CRS and PCFICH (the first OFDM symbol) in one or more OFDM symbols configured by PHICH duration.

Figure 6:
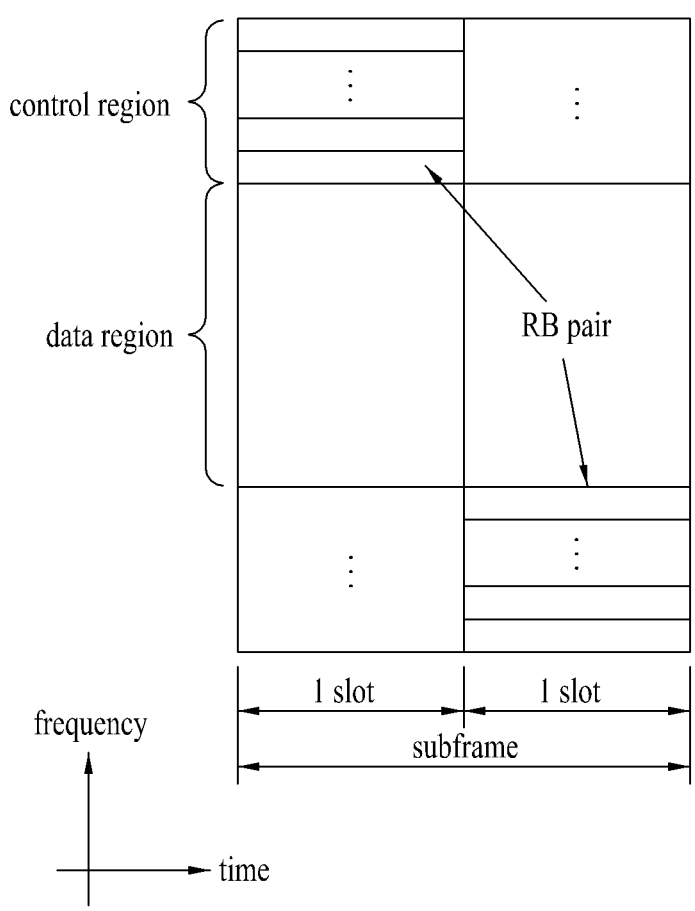
FIG. 6 is an uplink subframe structure for use in the LTE.

FIG. 6 is an uplink subframe structure for use in the LTE.

Referring to FIG. 6, the UL subframe includes a plurality of slots (e.g., 2 slots). Each slot may include different numbers of SC-FDMA symbols according to CP (Cyclic Prefix) length. In an example, one slot may comprise 7 SC-FDMA symbols in the case of a normal CP, and one slot may comprise 6 SC-FDMA symbols in the case of an extended CP. The UL subframe is divided into a data region and a control region. The data region includes PUCCH and transmits a data signal (e.g. uplink shared channel or UL-SCH) such as a voice signal or the like. The control region includes PUCCH, and transmits Uplink Control Information (UCI). PUCCH includes a pair of RBs (hereinafter referred to as an RB pair) (e.g. m=0, 1, 2, 3) located at both ends of the data region on a frequency axis (e.g. RB pairs having frequency mirrored locations), and is hopped using a slot as a boundary.

As described with reference to FIG. 2, in the legacy LTE system, PUSCH is used to carry data (e.g. uplink shared channel or UL-SCH) received from a higher layer, and PUCCH is used to carry uplink control information (UCI). Since the legacy LTE UE is unable to simultaneously transmit PUCCH and PUSCH, it multiplexes UCI to a PUSCH region when UCI (e.g., CQI/PMI, HARQ-ACK, RI, etc.) transmission is needed for a subframe via which PUSCH is transmitted. For example, in case that CQI and/or PMI (CQI/PMI) transmission is required in a subframe to which PUSCH transmission is allocated, the UE multiplexes UL-SCH data and CQI/PMI prior to DFT spreading, and then simultaneously transmits control information and data over PUSCH. However, since the LTE-A UE can simultaneously transmit control information and data via PUSCH, UCI can be transmitted together with UL-SCH in case that a simultaneous transmission of PUSCH and PUCCH is configured and an UCI transmission is needed in a subframe via PUSCH is transmitted.

The amount of control information (i.e., UCI), that is capable of being transmitted in a subframe by the UE, is dependent upon the number of SC-FDMAs available for UCI transmission. SC-FDMAs available in UCI transmission indicate the remaining SC-FDMA symbols other than SC-FDMA symbols that are used for Reference Signal (RS) transmission in a subframe. In the case of a subframe in which a Sounding Reference Signal (SRS) is configured, the last SC-FDMA symbol of the subframe is also excluded.

Figure 7:
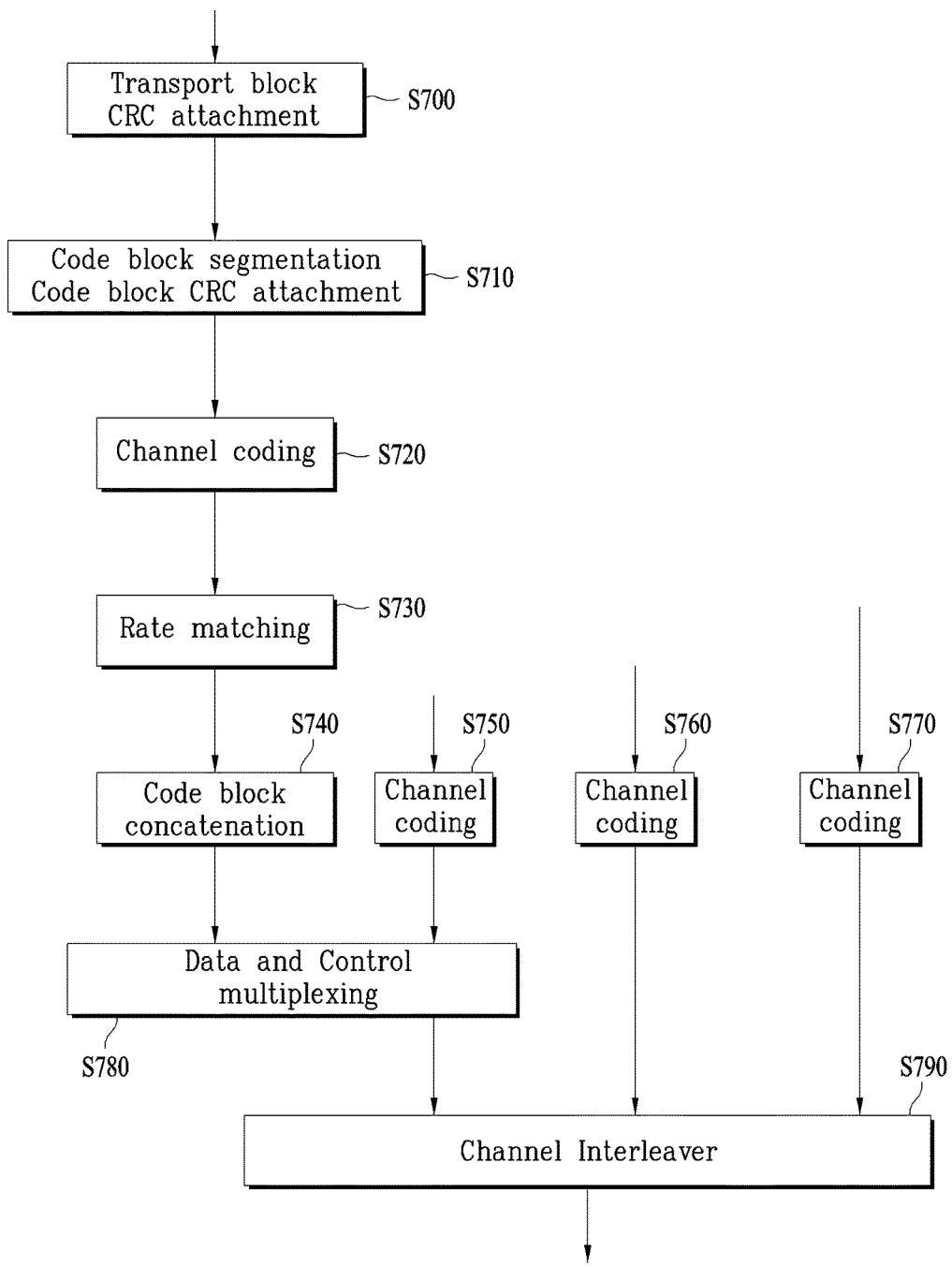
FIG. 7 is a flowchart illustrating a process for processing UL-SCH data and control information.

FIG. 7 is a flowchart illustrating a process for processing UL-SCH data and control information.

Referring to FIG. 7, error detection is provided to a UL-SCH transport block (TB) through Cyclic Redundancy Check (CRC) attachment (S700). After performing transport block (TB) CRC attachment, code block segmentation and code block CRC attachment are performed (S710). The channel coding is performed after performing the code block segmentation and code block CRC attachment (S720). For example, turbo coding may be used for such channel coding. Rate matching may be performed after the channel coding (S730). The rate matching refers to an operation for adjusting a rate (or transmission rate) of transmitted bits by puncturing or repetition. Code block concatenation is performed after the rate matching (S740). Information provided after the code block concatenation may correspond to a UL-SCH codeword.

In the case of UL control information, channel quality information (CQI and/or PMI), RI and HARQ-ACK are independently channel-coded. UCI channel coding is performed on the basis of the number of coded symbols for each piece of control information. For example, the number of coded symbols may be used for rate matching of the coded control information. In a subsequent process, the number of coded symbols may correspond to the number of modulation symbols or the number of REs.

Channel coding of channel quality information is performed using an input bit sequence (S750). Channel quality information uses different channel coding schemes according to the number of bits. In addition, if channel quality information is composed of 11 bits or more, a CRC bit is attached to the channel quality information. In order to set to the length of a bit sequence, the coded channel quality information may be rate-matched.

Channel coding of RI is performed using an input bit sequence including rank indication information (S760). The input bits sequence including the rank indication information indicates 1-bit RI and 2-bit RI, respectively. In the case of the 1-bit RI, repetition coding is used. In the case of the 2-bit RI, the (3, 2) simplex code is used, and the encoded data may be cyclically repeated.

The channel coding of HARQ-ACK is performed using the input bit sequence including HARQ-ACK information. The input bit sequence including HARQ-ACK information indicates 1-bit HARQ-ACK and 2-bit HARQ-ACK. ACK is encoded to 1, and NACK is encoded to 0. In the case of 1-bit HARQ-ACK, repetition coding is used. In the case of 2-bit HARQ-ACK, the (3, 2) simplex code is used, and encoded data may be cyclically repeated.

The coded UL-SCH codeword and the coded CQI/PMI bit sequence are multiplexed by a data/control multiplexing block (S780). The input of a channel interleaver includes output data of the data and control multiplexing block, the encoded rank indicators and coded HARQ-ACK data (S790). The channel interleaver multiplexes control information and UL-SCH data for PUSCH transmission. In more detail, the channel interleaver includes a process of mapping control information and UL-SCH data to a channel interleaver matrix corresponding to PUSCH resources.

After execution of channel interleaving, the bit sequence that is read row by row from the channel interleaver matrix is then output. The read bit sequence is mapped on a resource grid.

Figure 8:
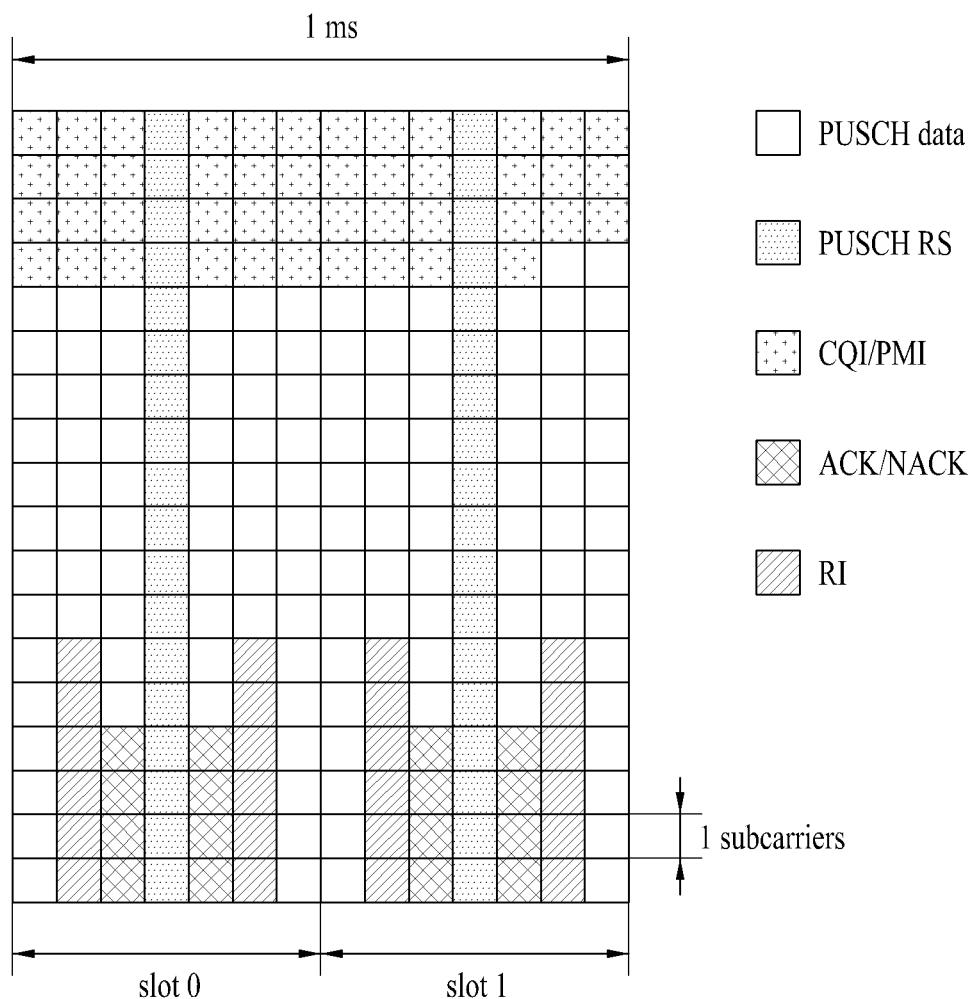
FIG. 8 illustrates multiplexing of control information and UL-SCH data on a PUSCH.

FIG. 8 illustrates multiplexing of control information and UL-SCH data on a PUSCH.

When transmitting control information in a subframe to which PUSCH transmission is allocated, the UE simultaneously multiplexes control information (UCI) and UL-SCH data prior to DFT spreading. The control information (UCI) includes at least one of CQI/PMI, HARQ ACK/NACK and RI. UL-SCH data and control information are not mapped to the same RE. Control information is mapped to be contained in two slots of the subframe. A base station (BS) can pre-recognize control transmission to be transmitted over PUSCH, such that it can easily demultiplex control information and a data packet.

Referring to FIG. 8, CQI and/or PMI (CQI/PMI) resources are located at the beginning part of UL-SCH data resources, are sequentially mapped to all SC-FDMA symbols on one subcarrier, and are finally mapped in the next subcarrier. CQI/PMI is mapped from left to right within each subcarrier (i.e., in the direction of increasing SC-FDMA symbol index). PUSCH data (UL-SCH data) is rate-matched in consideration of the amount of CQI/PMI resources (i.e., the number of encoded symbols). The modulation order identical to that of UL-SCH data may be used in CQI/PMI. If the CQI/PMI information size (payload size) is small (e.g., 11 bits or less), the CQI/PMI information may use the (32, k) block code in a similar manner to PUCCH transmission, and the encoded data may be cyclically repeated. If CQI/PMI information is small in size, CRC is not used. If CQI/PMI information is large in size (e.g., 11 bits or higher), 8-bit CRC is added thereto, and channel coding and rate matching are performed using a tail-biting convolutional code. ACK/NACK is inserted into some resources of the SC-FDMA mapped to UL-SCH data through puncturing. ACK/NACK is located close to RS, fills the corresponding SC-FDMA symbol from bottom to top (i.e., in the direction of increasing subcarrier index) within the SC-FDMA symbol. In case of a normal CP, the SC-FDMA symbol for ACK/NACK is located at SC-FDMA symbols (#2/#4) in each slot as can be seen from FIG. 8. Irrespective of whether ACK/NACK is actually transmitted in a subframe, the encoded RI is located next to the symbol for ACK/NACK. Each of ACK/NACK, RI and CQI/PMI is independently encoded.

Figure 9:
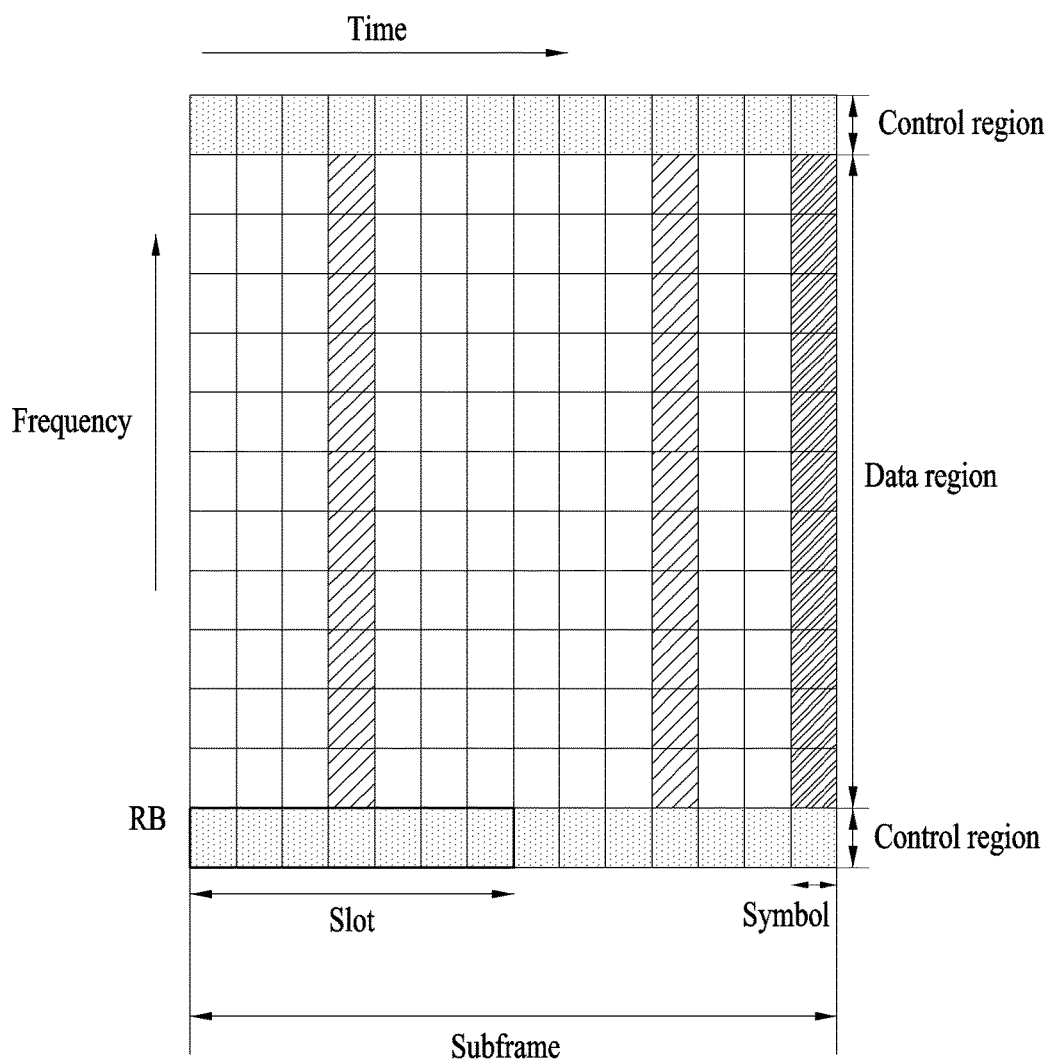
FIG. 9 illustrates a reference signal used in an uplink subframe in the LTE system.

FIG. 9 illustrates a reference signal used in an uplink subframe in the LTE system.

When a signal is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

The LTE system supports Sounding Reference Signal (SRS) and Demodulation Reference Signal (DMRS) as uplink reference signals. Demodulation reference signal may be combined with PUSCH or PUCCH transmission, and may be transmitted by a UE to a base station for demodulation of an uplink signal. Sounding reference signal may be transmitted by a UE to a base station for uplink scheduling. A base station estimates an uplink channel using the received sounding reference signal, and uses the estimated uplink channel for uplink scheduling. The SRS is not combined with a PUSCH or PUCCH transmission.

Referring to FIG. 9, a user equipment may periodically or non-periodically transmit an SRS (sounding reference signal) to estimate a channel for an uplink band (sub band) except a band on which PUSCH is transmitted or obtain information on a channel corresponding to a whole UL bandwidth (wide band). In case of periodically transmitting the SRS, a period may be determined via an upper layer signal. In case of non-periodically transmitting the SRS, a base station may indicate the transmission of the SRS using an 'SRS request' field of an UL-DL DCI format on PDCCH or trigger the transmission of the SRS using a triggering message. In case of a non-periodic SRS, a user equipment may transmit the SRS only when the SRS is indicated via PDCCH or a triggering message is received.

As shown in FIG. 9, a region capable of receiving an SRS in a subframe corresponds to a period at which an SC-FDMA symbol, which is located at the last of a time axis in the subframe, is situated. In case of a TDD special subframe, an SRS may be transmitted via UL period (e.g., UpPTS). In case of a subframe configuration allocating a single symbol to UL period (e.g., UpPTS) according to Table 2, an SRS may be transmitted via the last symbol. In case of a subframe configuration allocating 2 symbols, an SRS may be transmitted via the last one or two symbols. SRSs of many user equipments transmitted in the last SC-FDMA of an identical subframe may be distinguished from each other according to a frequency position.

Unlike PUSCH, DFT (discrete Fourier Transform) operation used for converting into SC-FDMA is not performed for SRS and the SRS is transmitted without using a precoding matrix which is used by PUSCH. Thus, if SRS and PUSCH are transmitted simultaneously in one subframe in a single carrier system, PUSCH is required to be rate-matched for resources except for the last symbol interval of a corresponding subframe. Rate-matching may refer to an operation adjusting a rate (or throughput) to a desired value by puncturing or repeating bits to be transmitted. Further, transmitting PUSCH except for the last symbol interval of a subframe may be referred to as a rate-matched PUSCH.

Figure 10:
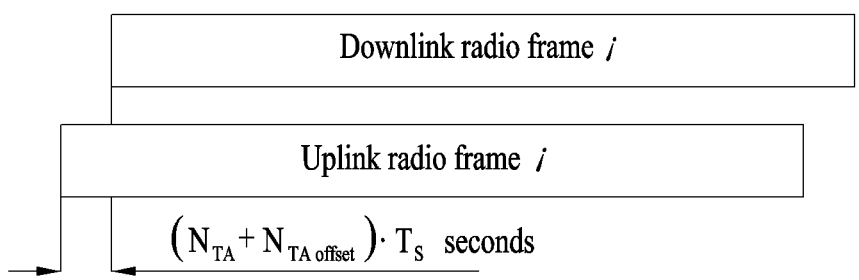
FIG. 10 illustrates an example of uplink-downlink timing relation.

FIG. 10 illustrates an example of uplink-downlink timing relation.

In the LTE system based on an orthogonal frequency division multiplex (OFDM) technology, the length of time a signal takes to reach a base station from a UE may vary according to a radius of a cell, a location of the UE in a cell, a mobility of the UE, etc. That is, unless the base station controls UL transmission timing for each UE, there is possibility of interferences between UEs during a communication between the UE and the base station, and this causes an increase of error rate in the base station. The length of time a signal takes to reach a base station from a UE may be referred to as a timing advance. Assuming that a UE may be located randomly within a cell, the timing advance from the UE to the eNB may be varied based on a location of the UE. Thus, a base station must manage or handle all data or signals transmitted by UEs within the cell in order to prevent interferences between UEs. Namely, a base station must adjust or manage a transmission timing of UEs according to each UE's circumstances, and such adjustment or management may be referred to as a maintenance of timing advance (or time alignment).

The maintenance of timing advance (or time alignment) may be performed via a random access procedure. During the random access procedure, a base station receives a random access preamble transmitted from a UE, and the base station can calculate a timing advance (Sync) value using the received random access preamble, where the timing advance value is to adjust (i.e., faster or slower) a signal transmission timing of the UE. The calculated timing advance value can be notified to the UE by a random access response, and the UE may update the signal transmission timing based on the calculated timing advance value. As an alternative, a base station may receive a sounding reference signal (SRS) transmitted from a UE periodically or randomly, the base station may calculate the timing advance (Sync) value based on the SRS, and the UE may update the signal transmission timing based on the calculated timing advance value.

As explained above, a base station may measure a timing advance of a UE via a random access preamble or SRS, and may notify an adjustment value of time alignment to the UE. Here, the value for time alignment (i.e., the adjustment value of time alignment) can be referred to as a timing advance command (TAC). The TAC may be processed by a MAC (medium access control) layer.

With reference to FIG. 10, transmission of the uplink radio frame number i from a UE may start $(N_{TA}+N_{TAoffset}) \times T_s$ seconds before the start of the corresponding downlink radio frame at the UE, where $0 \leq N_{TA} \leq 20512$, $N_{TAoffset}=0$ for FDD frame structure and $N_{TAoffset}=624$ for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset}) \times T_s$. UL transmission timing may be adjusted in units of a multiple of $16T_s$. $T_s$ represents a sampling time. A timing advance command (TAC) in a random access response is 11 bits and indicates a value of 0 to 1282, and $N_{TA}$ is given as $N_{TA}$=TA*16. Alternatively, a timing advance command (TAC) is 6 bits and indicates a value of 0 to 63, and $N_{TA}$ is given as $N_{TA,old}$+(TA−31)*16. The timing advance command received in subframe n is applied starting from subframe n+6.

Figure 11:
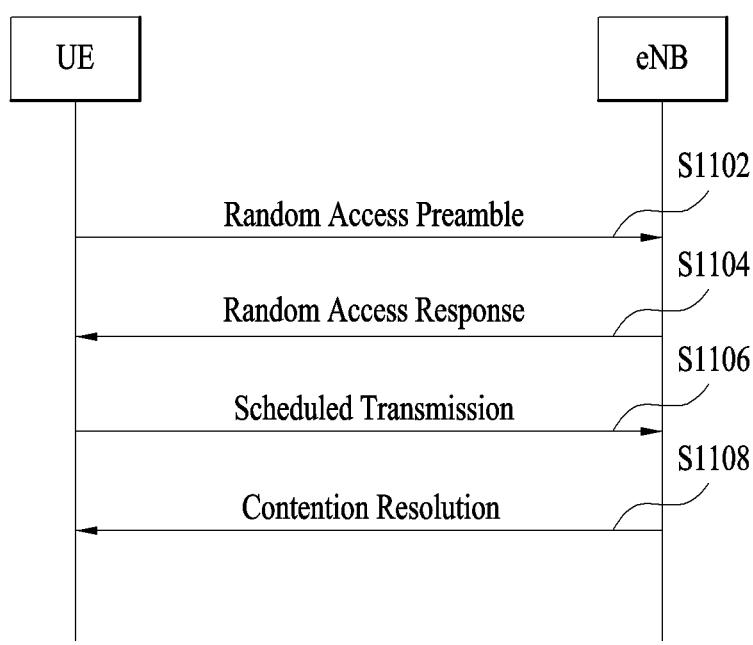
FIG. 11 illustrates a contention-based random access procedure.

In case that a plurality of serving cells are used in a UE, there may exist serving cells having similar timing advance characteristics. For example, serving cells using similar frequency characteristics (e.g. frequency bands) may have similar timing advance characteristics. Thus, when carrier aggregation (CA) is configured, serving cells having similar timing advance characteristics may be managed as a group to optimize signaling overhead due to adjustment of a plurality of uplink timing synchronizations. Such a group may be referred to as timing advance group (TAG). Serving cell(s) having similar timing advance characteristics may belong to one TAG; and at least one serving cell(s) must have an uplink resource in the TAG For each serving cell, a base station may inform a UE of TAG allocation using a TAG identifier through a higher layer signaling (e.g. RRC signaling). Two or more TAGs may be configured for one UE. If a TAG identifier indicates 0, this may imply a TAG including a PCell. For convenience, a TAG including a PCell may be referred to as a primary TAG (pTAG), and TAG(s) other than a pTAG may be referred to as a secondary TAG (sTAG or secTAG). A secondary TAG identifier (sTAG ID) may be used to indicate sTAG corresponding to an SCell. If an sTAG ID is not configured for an SCell, the SCell may be configured as a part of pTAG FIG. 11 illustrates a contention-based random access procedure. In the LTE system, a user equipment may perform a random access procedure in one of the following cases.

The user equipment performs an initial access without a connection (e.g., RRC connection) with an eNode B.

The user equipment initially accesses a target cell in a handover procedure.

The random access procedure is requested by a command from a base station.

In a situation that time synchronization of uplink is not matched

In a situation that a designated radio resource used to request a radio resource is not allocated, data in uplink is generated.

A recovery procedure is performed in case of radio link failure or handover failure.

Referring to FIG. 11, in S1102, a user equipment may transmit a random access preamble. The user equipment randomly selects a random access preamble from a set of random access preambles indicated by system information or a handover command, and then transmits the selected random access preamble via a PRACH. The message transmitted in S1102 may be referred to as a first message or Msg1.

After the user equipment has transmitted the random access preamble, in S1104, the user equipment may receive a random access response. To this end, the user equipment attempts a reception of its random access response within a random access response receiving window indicated through the system information or the handover command. For example, the random access response information may be received via PDSCH (physical downlink shared channel), and in order to receive the information carried on the PDSCH, the user equipment may monitor PDCCH (physical downlink control channel). Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response. The message transmitted by the user equipment in S1104 may be referred to as a second message or Msg2.

If the user equipment receives the random access response valid for the user equipment, in S1106, the user equipment may perform an uplink transmission based on information included in the random access response. For example, the user equipment applies the TAC and saves the temporary cell identifier. Moreover, the user equipment may be able to save data, which is to be transmitted in response to the valid random access response, in a buffer. The data transmitted by the user equipment in S1106 includes an identifier of the user equipment. In the contention based random access procedure, the base station is unable to determine which user equipment performs the random access procedure. In order for resolve the contention later, the base station needs to identify a user equipment. The uplink transmission in S1106 may be referred to as a third message or Msg3.

As a method of including an identifier of a user equipment, two kinds of methods have been discussed. The user equipment may have a valid cell identifier already allocated by a corresponding cell prior to the random access procedure, and in this case the user equipment transmits its cell identifier via UL transmission signal corresponding to the UL grant. On the other hand, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer.

After the user equipment has transmitted the data including its identifier via the UL grant included in the random access response, in S1108, the user equipment may attempt a reception of PDCCH to receive a specific message. If the $3^{rd}$ message transmitted in response to the UL grant uses a cell identifier as its identifier, the user equipment attempts a reception of PDCCH using its cell identifier. If the PDCCH is received via its cell identifier before expiration of the contention resolution timer, the user equipment determines that the random access procedure is normally performed and then ends the random access procedure. The message received from the base station in S1108 may be referred to as a fourth message or Msg4.

Meanwhile, in an operation of a non-contention based random access procedure, unlike the contention based random access procedure shown in FIG. 11, a random access procedure is ended with a $1^{st}$ message transmission and a $2^{nd}$ message transmission only. Yet, before a user equipment transmits a random access preamble as a $1^{st}$ message to a base station, the user equipment receives assignment of the random access preamble from the base station, transmits the assigned random access preamble as the $1^{st}$ message to the base station, and then receives a random access response from the base station, whereby the random access procedure is ended.

In the present specification, the random access procedure may be referred to as a RACH procedure.

Figure 12:
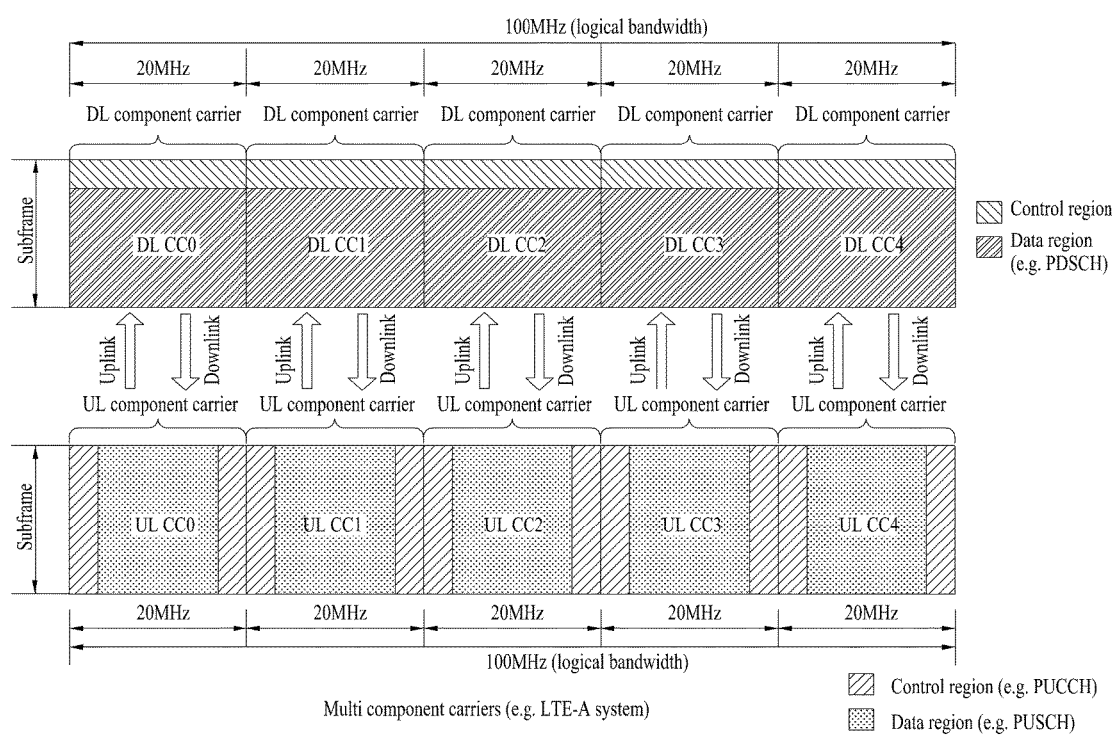
FIG. 12 illustrates a carrier aggregation (CA) communication system.

FIG. 12 illustrates a carrier aggregation (CA) communication system.

Referring to FIG. 12, a wider UL/DL bandwidth may be supported in a manner of collecting a plurality of UL/DL component carriers (CCs). A technology of collecting and using a plurality of the component carriers is referred to as a carrier aggregation or bandwidth aggregation. A component carrier can be comprehended as a carrier frequency (or center carrier, center frequency) for a corresponding frequency block. Each of a plurality of the component carriers can be adjacent or non-adjacent to each other in frequency domain. A bandwidth of each component carrier can be independently determined. It may configure an asymmetrical carrier aggregation of which the number of UL CCs is different from the number of DL CCs. For instance, there are 2 DL CCs and 1 UL CC, asymmetrical carrier aggregation can be configured in a manner that the DL CC corresponds to the UL CC by 2:1. A link between a DL CC and an UL CC is fixed in a system or can be semi-statically configured. Although a whole system band consists of N number of CCs, a frequency band capable of being monitored/received by a specific user equipment can be restricted to M (<N) number of CCs. Various parameters for carrier aggregation can be configured by a cell-specific, a UE group-specific or a UE-specific scheme.

Meanwhile, PUCCH may be configured to be transmitted and received on a specific CC only. Such specific CC is referred to as a primary CC (PCC) and the rest of CCs are referred to a secondary CC (SCC). The PCC can be used for a user equipment to perform an initial connection establishment process or a connection re-establishment process. The PCC may correspond to a cell indicated in a handover process. The SCC can be configured after an RRC connection is established and can be used to provide an additional radio resource. As an example, scheduling information can be configured to be transceived via a specific CC only. This sort of scheduling scheme is called cross-carrier scheduling (or cross-CC scheduling). If the cross-CC scheduling is applied, PDCCH for DL assignment is transmitted on a DL CC #0 and corresponding PDSCH can be transmitted on a DL CC #2. The term 'component carrier' may be replaced with a different equivalent terminology such as a carrier, a cell or the like. For example, PCC and SCC may be interchangeably used with PCell and SCell, respectively.

In uplink (UL) of LTE-A (e.g., Rel-10/11) system, which operates based on CA (carrier aggregation) on a plurality of cells, a method of transmitting uplink control information (UCI) such as HARK-ACK, (periodic) CSI, and the like on PUSCH by piggybacking the UCI can be summarized as follows. In the following, PUSCH on which Msg3 is transmitted can be referred to as Msg3 PUSCH.

In case of transmitting UCI via PUSCH on Pcell

If there is PUSCH transmission on a Pcell and the PUSCH is not used for (re)transmitting Msg3 accompanied with a contention-based random access procedure, in particular, if PUSCH transmission scheduled on a Pcell is not used for (re)transmitting Msg3 in the contention-based random access procedure, a UE can transmit UCI to a base station via the PUSCH scheduled on the Pcell.

In case of not transmitting UCI or in case of dropping or skipping UCI transmission If there is PUSCH transmission on a Pcell and the PUSCH is used for (re)transmitting Msg3 accompanied with a contention-based random access procedure, in particular, if PUSCH transmission scheduled on a Pcell is used for (re)transmitting Msg3 in the contention-based random access procedure, a UE may not transmit UCI or may drop UCI transmission. A case of not transmitting UCI or a case of dropping UCI transmission is referred to as "UCI case" in the present specification.

In case of transmitting UCI via PUSCH on Scell

If there is no PUSCH transmission on a Pcell and the PUSCH is transmitted on at least one Scell, in particular, since a contention-based random access procedure is performed on the Pcell, if there is no PUSCH transmission scheduled on the Pcell, the scheduled PUSCH transmission is not used for (re)transmitting Msg3 in the contention-based random access procedure. Hence, a UE can transmit UCI to a base station via PUSCH scheduled on the Scell.

And, in case of a legacy LTE(-A) system, in order to perform stable PUSCH transmission in a state that a plurality of TAGs are not configured and in order to perform stable multiplexing on Msg3 transmission among a plurality of UEs (in consideration of PUSCH rate matching) in a random access procedure (or a RACH procedure), it may be able to apply an SRS processing method described in the following.

If SRS is not transmitted or SRS transmission is dropped

If SRS transmission and PUSCH transmission are overlapped in the same symbol in a state that a plurality of TAGs are not configured, in particular, if a plurality of TAGs are not set to a UE and SRS transmission and PUSCH transmission are overlapped in the same symbol, the UE may not transmit SRS or the UE may drop SRS transmission.

If SRS transmission and (re)transmission of PUSCH on which Msg3, which is accompanied with a contention-based random access procedure, is carried are required by an identical subframe (SF), in particular, if the SRS transmission and PUSCH transmission, which is used for (re)transmitting Msg3 in the contention-based random access procedure, are set to the same subframe, a UE may not transmit SRS in the subframe or the UE may drop SRS transmission in the subframe.

A case of not transmitting SRS or a case of dropping SRS transmission is referred to as 'SRS case' in the present specification.

Based on the aforementioned operation of the legacy LTE(-A) system, it may consider a situation that PUSCH transmission for transmitting Msg3 is set on the Pcell and PUSCH transmission is additionally set on at least one Scell. In this situation, if the UCI case is applied as it is, both Pcell PUSCH and Scell PUSCH are transmitted without UCI piggyback (e.g., puncturing for HARK-ACK, rate-matching with CSI). In this case, the UCI can be dropped or skipped without being transmitted.

And, in the same situation, it may be able to schedule PUSCH transmission for transmitting Msg3 at timing rather than a cell-specific SRS subframe (SF) or schedule the PUSCH transmission at the outside of a cell-specific SRS bandwidth (BW) (in order not to accompany rate-matching (at the last symbol) on the Pcell and it may be able to schedule the PUSCH transmission at the outside of the cell-specific SRS BW on the Scell. At the same time, SRS transmission on the Scell can be configured. In this case, if the SRS case is applied as it is, both the Pcell PUSCH and the Scell PUSCH can be transmitted without rate-matching and the SRS transmission can be dropped or skipped.

Meanwhile, a UE can autonomously select/transmit a PRACH preamble for such as specific purpose as scheduling request and the like in a situation rather than an initial access procedure to perform a contention-based random access procedure (or a RACH procedure). Yet, a base station (or eNB) is unable to specify a UE until contention resolution is completed via Msg3 and/or Msg4 transmission corresponding to the random access procedure. Hence, the base station schedules Msg3 transmission for an identical UE in the Pcell until the contention resolution is completed by completing the random access procedure. Although PUSCH is scheduled on the Scell, it is unable to know whether or not a UE transmitting Msg3 is identical to a UE transmitting PUSCH on the Scell. Hence, although PUSCH transmission on the Scell is scheduled to the UE, it may be difficult for the base station to identify a fact that the UE transmits Msg3 PUSCH on the Pcell. Hence, in the aspect of the base station (eNB), for the UCI case, it may be able to anticipate that UCI is received in a manner of being piggybacked on the Scell PUSCH. And, for the SRS case, it may be able to anticipate that Scell PUSCH is received in a manner of being rate-matched and SRS is also received on the Scell according to the configuration. In this case, since the UE drops UCI transmission and/or SRS transmission and the base station waits for UCI reception and/or SRS reception, discordance may occur between UE transmission and eNB reception. The discordance may bring about a serious problem such as UCI transmission error, UL data reception buffer corruption, UL channel estimation deterioration, and the like.

Hence, the present invention proposes a UL transmission operation for preventing UL transmission capability degradation (due to the discordance between the UE transmission and the eNB reception) in a CA (carrier aggregation)-based random access procedure (or a RACH procedure). A method according to the present invention can be restrictively applied to at least one or more situation described in the following.

Contention-based random access procedure (or a RACH procedure)

Situation that (periodic) CSI is included in UCI (UCI case)

Situation that a plurality of TAGs are not set (SRS case)

If a plurality of TAGs are not set, a plurality of carrier aggregated cells can be included in a single TAG (e.g., a primary TAG). Specifically, a primary TAG can be set to a UE only. In addition, in case of the SRS case, the method according to the present invention can be more restrictively applied to a situation that PUSCH transmission for Msg3 is scheduled to a non-cell-specific SRS SF/BW rather than a cell-specific SRS subframe SF/BW on the Pcell, PUSCH transmission is scheduled to a non-cell-specific SRS BW rather than a cell-specific SRS BW on the Scell, and SRS transmission is configured on the Scell.

Method 1: Dropping or Skipping PUSCH Transmission on SCell

When handover is performed or UL time synchronization is not matched, a UE can perform a random access procedure to match the time synchronization. In this case, it may be more important for the UE to complete handover or match the time synchronization rather than to perform PUSCH transmission for transmitting general data. Hence, according to the method 1, PUSCH transmission for Msg3 is performed only on the Pcell in a state that all PUSCH transmissions scheduled on the Scell are dropped or skipped. In this case, UCI is not piggybacked to PUSCH. Or, similar to the UCI case, UCI transmission can be dropped.

The method 1 can be applied not only to the UCI case but also to the SRS case. Hence, the UE transmits PUSCH for Msg3 only on the Pcell and can drop SRS transmission. In this case, SRS transmission set on the Scell can be dropped as well.

According to the method 1, if the Pcell and at least one Scell are set to the UE, PUSCH transmission for Msg3 is set on the Pcell in a specific subframe, and PUSCH transmission for general data is set on the Scell in the same subframe, the UE performs the PUSCH transmission for Msg3 set on the Pcell only and drops the PUSCH transmission for general data set on the remaining Scell. In this case, UCI is not piggybacked to the scheduled PUSCH and the UE can drop UCI transmission. If SRS transmission is set in the specific subframe, the UE can drop the SRS transmission on the Scell. In this case, the PUSCH for Msg3 set on the Pcell can be transmitted without rate-matching and the PUSCH transmission set on the Scell is not performed in a manner of being dropped.

Figure 13:
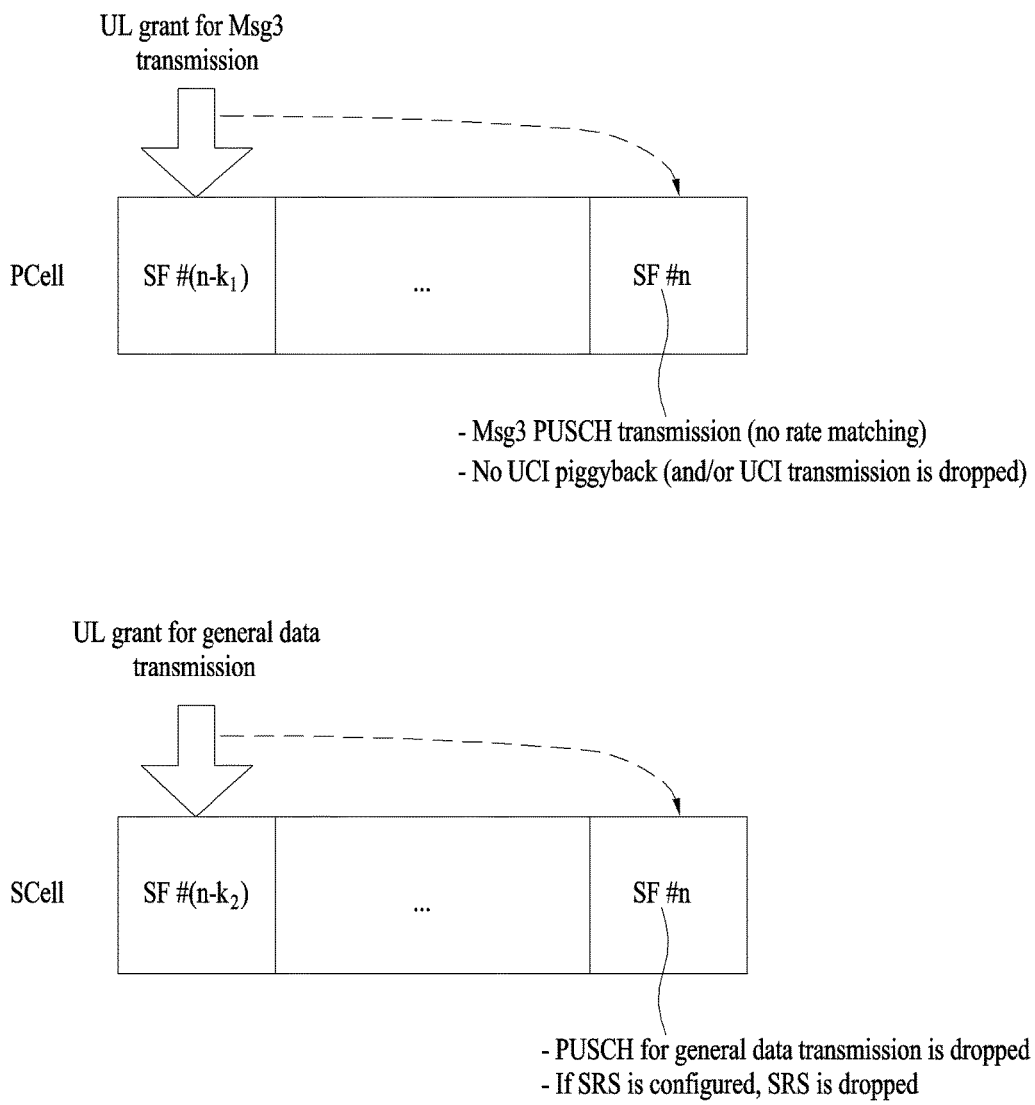
FIGS. 13 to 16 show exemplary methods of transmitting uplink according to the present invention.

FIG. 13 shows an example of a method of transmitting uplink according to the present invention.

In the example of FIG. 13, a UE receives a first UL grant for Msg3 transmission in a subframe #(n–$k_1$) of Pcell and receives a second UL grant for general data (e.g., UL-SCH) transmission in a subframe #(n–$k_2$) of Scell. The subframe #(n–$k_1$) and the subframe #(n–$k_2$) may correspond to subframes identical to each other or subframes different from each other. In the example of FIG. 13, although it is depicted as the second UL grant for general data transmission is received on the Scell, by which the present invention may be non-limited. For example, if cross carrier scheduling is configured, the UE can receive the second UL grant for general data (e.g., UL-SCH) transmission in a subframe (SF) #(n–$k_2$) of the Pcell.

And, the first UL grant includes information for scheduling PUSCH transmission on the Pcell in a subframe #n and the first UL grant can be received via a random access response according to a contention-based random access procedure (refer to S1104 of FIG. 11). Hence, the first UL grant can be received via PDSCH. The second UL grant includes information for scheduling PUSCH transmission in the subframe #n and the second UL grant can be received via a general PDCCH (refer to S207 of FIG. 2 and explanation on FIG. 5)

According to the method 1 of the present invention, the UE performs PUSCH transmission for Msg3 based on the first UL grant on the Pcell and drops PUSCH transmission corresponding to the second UL grant on the Scell. And, if SRS transmission is configured in the subframe #n, the UE drops the SRS transmission on the Scell. And, UCI is not piggybacked to PUSCH for Msg3 which is transmitted on the Pcell and UCI transmission can be dropped.

Method 2: Dropping Msg3 on PCell

If UL data occurs in a situation that a designated radio resource is not allocated, a UE can initiate a random access procedure for the purpose of a scheduling request and the like. If PUSCH for transmitting Msg3 on the Pcell and PUSCH for transmitting general data on the Scell are scheduled to the same subframe in the middle of performing the random access procedure, since the UE is able to transmit the UL data via the PUSCH for transmitting general data, the UE can achieve the original object. Hence, since it is not necessary for the UE to continuously perform the random access procedure, the UE may ignore scheduling information for Msg3 transmission or may drop or skip the PUSCH transmission scheduled on the Pcell.

According to the method 2 of the present invention, it may be able to drop PUSCH transmission for Msg3 scheduled on the Pcell only and it may be able to transmit UCI by piggybacking the UCI to PUSCH scheduled on a specific Scell. If SRS is configured, it may be able to transmit both PUSCH to which rate-matching is applied on the Scell and the SRS.

According to the method 2, if the Pcell and at least one Scell are set to the UE, PUSCH transmission for Msg3 is set on the Pcell in a specific subframe, and PUSCH transmission for general data is set on the Scell in the same subframe, the UE drops the PUSCH transmission for Msg3 set on the Pcell only and performs the PUSCH transmission for general data set on the remaining Scell. In this case, UCI can be transmitted in a manner of being piggybacked to the PUSCH on the Scell. If SRS transmission is set in the specific subframe, the UE can perform the SRS transmission on the Scell. In this case, rate-matching is performed on the PUSCH for transmitting general data set on the Scell except a symbol for transmitting SRS.

Figure 14:
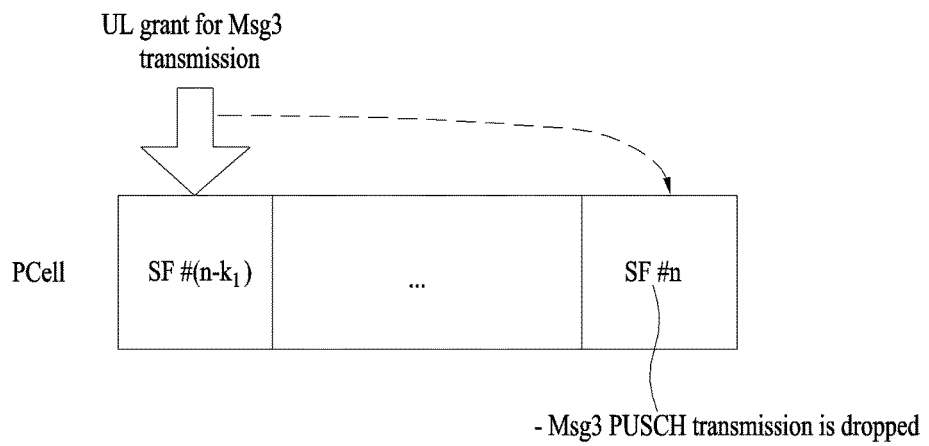
Figure 14:
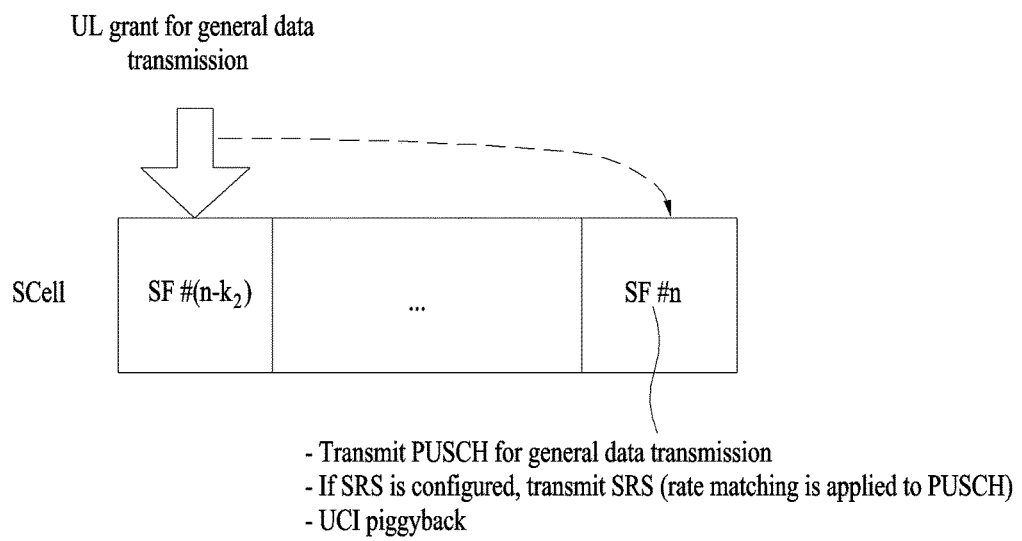

FIG. 14 shows an example of a method of transmitting uplink according to the present invention. In the example of FIG. 14, as mentioned earlier with reference to FIG. 13, assume that Pcell and at least one Scell are set to a UE and the UE receives a first grant and a second grant.

Referring to FIG. 14, in a subframe #n, the UE drops PUSCH transmission for Msg3 scheduled by the first UL grant on the Pcell and performs PUSCH transmission corresponding to the second grant on the Scell. And, if SRS transmission is configured in the subframe #n, the UE performs SRS transmission on the Scell. And, UCI can be transmitted in a manner of being piggybacked to PUSCH which is transmitted on the Scell.

The method 2 of the present invention can be more profitably applied to a situation that a contention-based random access procedure (or a RACH procedure) is performed for the purpose of a scheduling request and the like. If the contention-based random access procedure (or a RACH procedure) is performed for the purpose of a scheduling request and the like, it may be able to more efficiently perform the contention-based random access procedure by transmitting information on UL data of a UE to a base station when a scheduling is requested. To this end, the UE can transmit BSR (buffer status report) to the base station via PUSCH scheduled on a specific Scell to inform the base station (or eNB) of UL data buffer state of the UE.

Method 3: Piggyback UCI to PUSCH on Scell

A UE can initiate a random access procedure by a different purpose (e.g., request of a base station) rather than such a purpose as UL time synchronization, a scheduling request, and the like. In this case, it may be more preferable for the UE to perform PUSCH transmission scheduled on the Scell together with the random access procedure. Hence, although PUSCH transmission for transmitting Msg3 and PUSCH transmission for transmitting general data are set to the same subframe, it may be preferable for the UE to perform the two transmissions at the same time.

According to the method 3 of the present invention, it may be able to perform both PUSCH transmission for Msg3 scheduled on the Pcell and PUSCH transmission scheduled on the Scell. In particular, the PUSCH transmission for Msg3 and the PUSCH transmission for general data are not dropped. In this case, UCI can be transmitted in a manner of being piggybacked to the PUSCH scheduled on the Scell.

According to the method 3, if the Pcell and at least one Scell are set to the UE, PUSCH transmission for Msg3 is set on the Pcell in a specific subframe, and PUSCH transmission for general data is set on the Scell in the same subframe, the UE performs both the PUSCH transmission for Msg3 set on the Pcell and the PUSCH transmission for general data set on the remaining Scell. In this case, UCI can be transmitted in a manner of being piggybacked to the PUSCH scheduled on the Scell.

Figure 15:
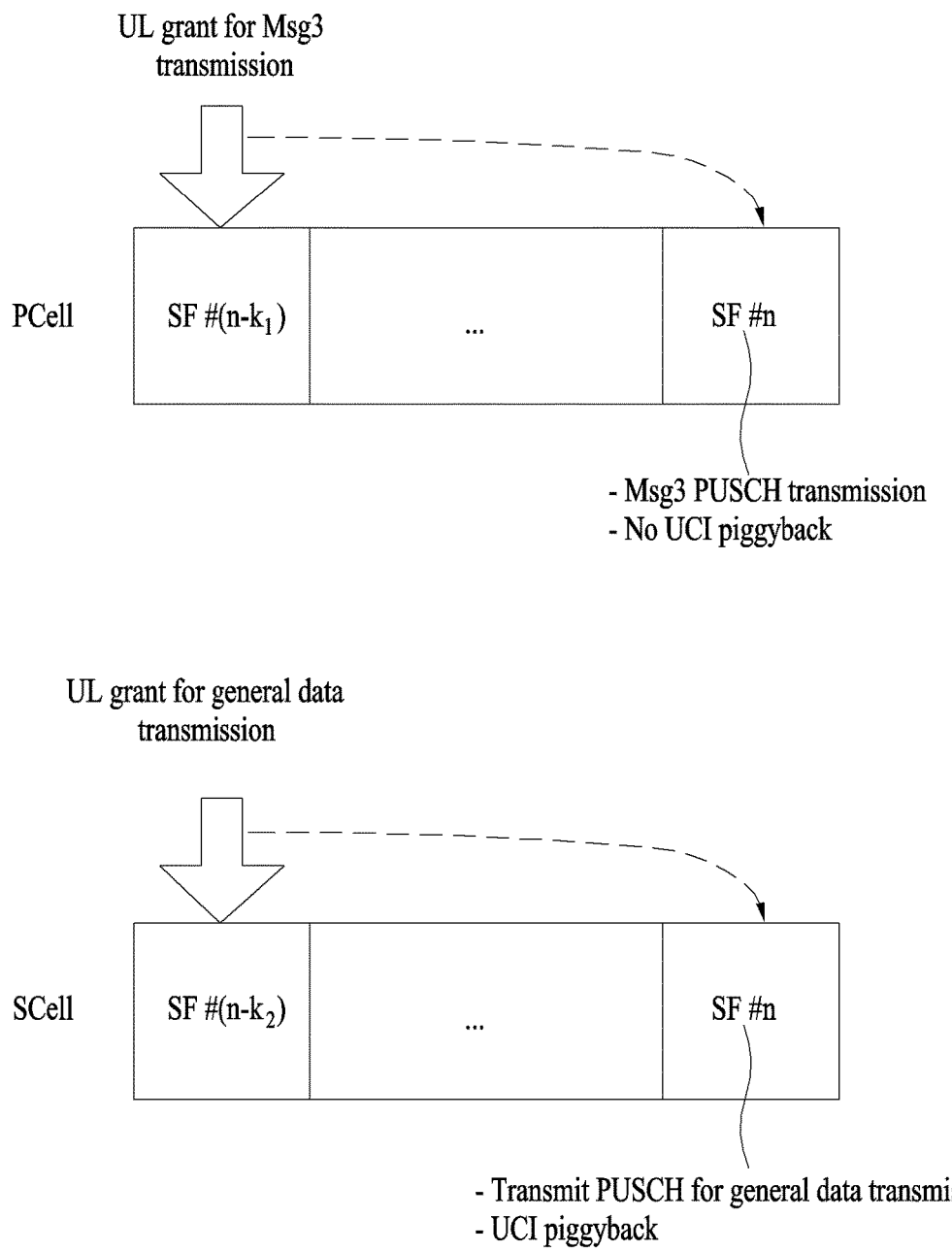

FIG. 15 shows an example of a method of transmitting uplink according to the present invention. In the example of FIG. 15, as mentioned earlier with reference to FIG. 13, assume that Pcell and at least one Scell are set to a UE and the UE receives a first grant and a second grant.

Referring to FIG. 15, in a subframe #n, the UE performs both PUSCH transmission for Msg3 scheduled by the first UL grant on the Pcell and PUSCH transmission corresponding to the second grant on the Scell at the same time. And, UCI is transmitted in a manner of being piggybacked to PUSCH which is transmitted on the Scell and the UCI is not piggybacked to PUSCH which is transmitted on the Pcell.

Method 4: PUSCH Rate-Matching on Scell without SRS Transmission

The method 4 of the present invention proposes to drop SRS transmission set on the Scell and perform rate-matching on PUSCH scheduled on the Scell. Hence, it may be able to perform both PUSCH transmission for Msg3 scheduled on the Pcell and PUSCH transmission rate-matched on the Scell. In this case, the PUSCH transmission for Msg3 and the PUSCH transmission for general data are not dropped.

According to the method 4, assume that the Pcell and at least one Scell are set to the UE, PUSCH transmission for Msg3 is set on the Pcell in a specific subframe, PUSCH transmission for general data is set on the Scell in the same subframe, and SRS transmission is set in the same subframe. In this case, the UE performs both the PUSCH transmission for Msg3 set on the Pcell and the PUSCH transmission for general data set on the remaining Scell at the same time, drops the SRS transmission on the Scell, and may be able to apply rate-matching to PUSCH.

Figure 16:
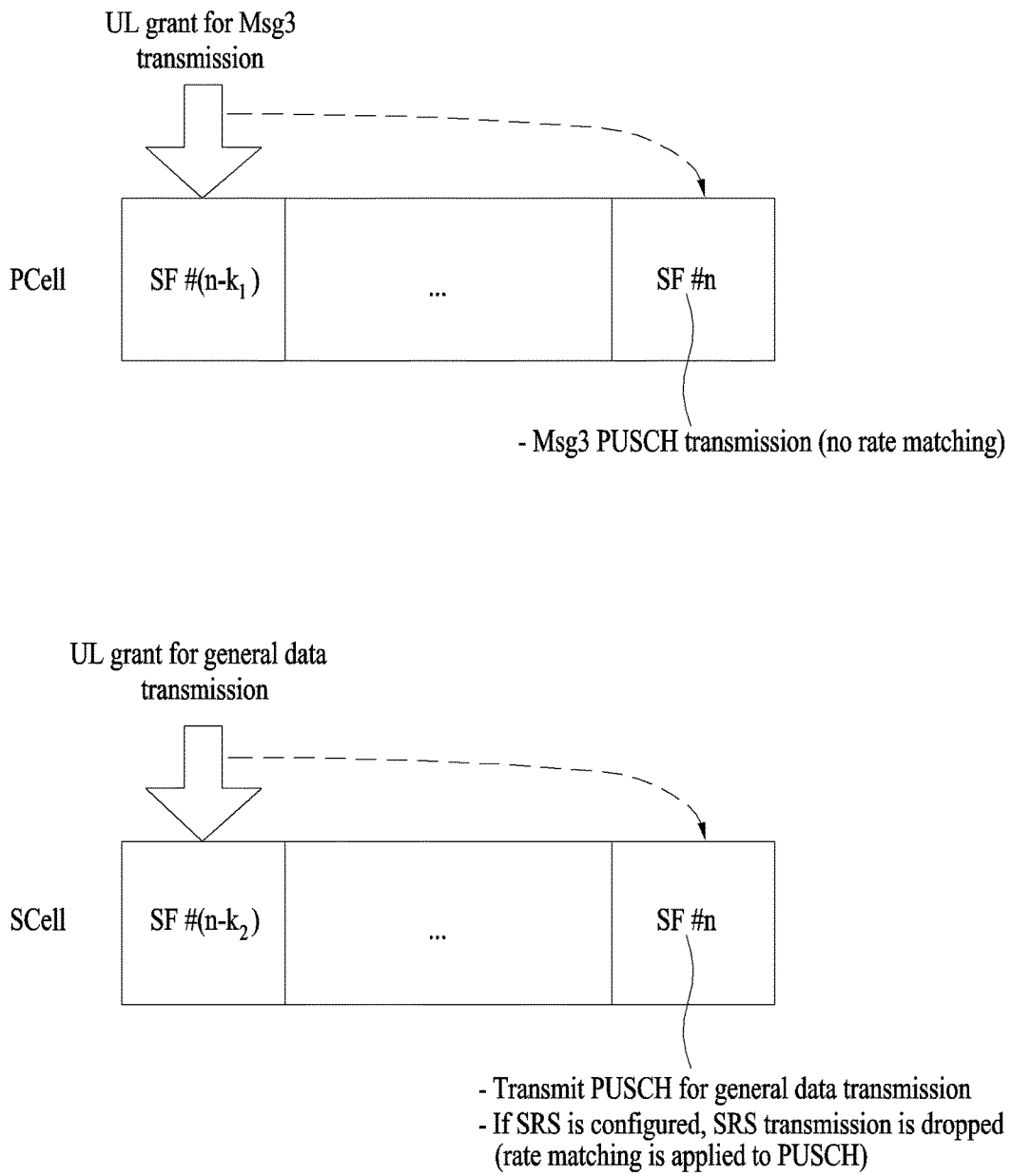

FIG. 16 shows an example of a method of transmitting uplink according to the present invention. In the example of FIG. 16, as mentioned earlier with reference to FIG. 13, assume that Pcell and at least one Scell are set to a UE and the UE receives a first grant and a second grant.

Referring to FIG. 16, SRS transmission is additionally set in a subframe #n. In the subframe #n, the UE applies rate-matching to PUSCH corresponding to the second UL grant on the Scell and drops the SRS transmission on the Scell. Hence, the UE performs both the PUSCH transmission for Msg3 scheduled by the first UL grant on the PCell and the rate-matched PUSCH transmission corresponding to the second UL grant on the SCell at the same time in the subframe #n.

In the methods (method 1 to 4) according to the present invention, if simultaneous transmission of PUCCH/PUSCH is not configured or allowed, UCI can include both HARQ-ACK information and (periodic) CSI information. On the contrary, if the simultaneous transmission of PUCCH/PUSCH is configured or allowed, the UCI includes the (periodic) CSI information only and the HARQ-ACK information can be transmitted via PUCCH. For example, when the HARQ-ACK information and the (periodic) CSI information are configured to be transmitted in the same subframe in the methods (method 1 to 4) according to the present invention, if the simultaneous transmission of PUCCH/PUSCH of the UE is not configured or allowed by a base station via higher layer (e.g., RRC), the UE can transmit both the HARQ-ACK information and the (periodic) CSI information to the base station by piggybacking the HARQ-ACK information and the (periodic) CSI information to PUSCH scheduled on the Scell. As a different example, in the methods (method 1 to 4) according to the present invention, when the HARQ-ACK information and the (periodic) CSI information are configured to be transmitted in the same subframe, if the simultaneous transmission of PUCCH/PUSCH of the UE is configured or allowed by the base station via higher layer (e.g., RRC), the UE transmits the HARQ-ACK information to the base station via PUCCH on the Pcell and transmits the (periodic) CSI information to the base station by piggybacking the CSI information to PUSCH scheduled on the Scell.

And, the methods (methods 1 to 4) according to the present invention can be independently implemented or can be implemented in a manner of being combined with each other. For example, a UE can selectively apply one of the methods 1 to 4 depending on a situation capable of profitably applying the methods 1 to 4. More specifically, in case of performing a random access procedure for handover or UL time synchronization, a UE operates according to the method 1. In case of performing the random access procedure for such a purpose as a scheduling request and the like, the UE operates according to the method 2. In case of performing the random access procedure for a base station request and the like, the UE may operates according to the method 3 or the method 4.

Figure 17:
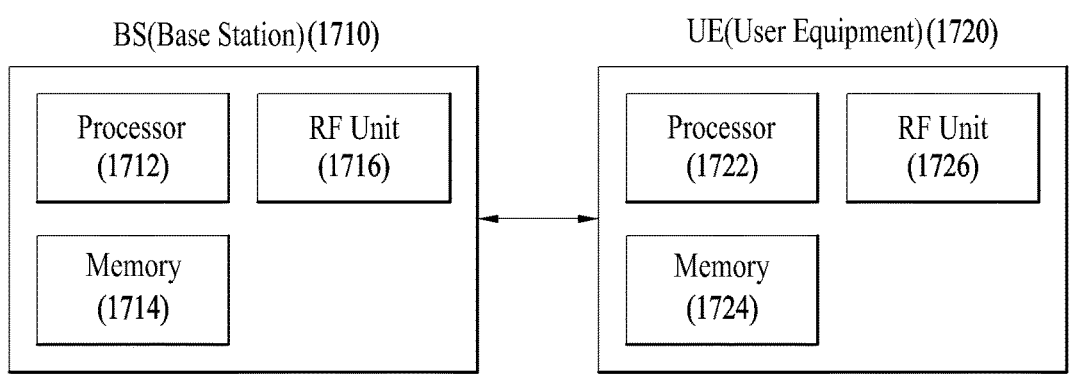
FIG. 17 is a diagram illustrating a base station and a user equipment to which the present invention is applicable.

FIG. 17 is a diagram illustrating a base station and a user equipment to which the present invention is applicable.

Referring to FIG. 17, a wireless communication system includes the BS 1710 and the UE 1720. When the wireless communication system includes a relay, the BS 1710 or the UE 1720 may be replaced with the relay.

The BS 1710 includes a processor 1712, a memory 1714, and a radio frequency (RF) unit 1716. The processor 1712 may be configured to embody the procedures and/or methods proposed by the present invention. The memory 1714 is connected to the processor 1712 and stores various pieces of information associated with an operation of the processor 1712. The RF unit 1716 is connected to the processor 1712 and transmits/receives a radio signal. The UE 1720 includes a processor 1722, a memory 1724, and an RF unit 1726. The processor 1722 may be configured to embody the procedures and/or methods proposed by the present invention. The memory 1724 is connected to the processor 1722 and stores various pieces of information associated with an operation of the processor 1722. The RF unit 1726 is connected to the processor 1722 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

What is claimed is:

1. A method for transmitting uplink control information by a user equipment in a wireless communication system supporting carrier aggregation of a plurality of cells containing a first cell and a second cell, the method comprising:
receiving a random access response via a physical downlink shared channel (PDSCH) from a base station,
wherein the random access response schedules a first physical uplink shared channel (PUSCH) transmission on the first cell;
receiving downlink control information via a physical downlink control channel (PDCCH) from the base station,
wherein the downlink control information schedules a second PUSCH transmission on the second cell; and
when the first PUSCH transmission and the second PUSCH transmission are configured in a same subframe, transmitting the uplink control information to the base station on the second cell via the second PUSCH,
wherein the first PUSCH transmission scheduled on the first cell is dropped.

2. The method of claim 1, wherein when a sounding reference signal (SRS) transmission is configured in the subframe, a rate-matching is applied to the second PUSCH.

3. The method of claim 1, wherein the uplink control information comprises channel state information (CSI), and the CSI comprises at least one of channel quality indication information, precoding matrix indication information, or rank indication information.

4. The method of claim 1, wherein when a hybrid automatic repeat and request acknowledgement (HARQ-ACK) transmission is configured in the subframe and a simultaneous transmission of physical uplink control channel (PUCCH) and PUSCH is not configured in the subframe, the HARQ-ACK is transmitted via the second PUSCH, and
wherein when the HARQ-ACK transmission is configured in the subframe and the simultaneous transmission of PUCCH and PUSCH is configured in the subframe, the HARQ-ACK is transmitted via a PUCCH on the first cell.

5. The method of claim 1, wherein the random access response is received in response to a random access preamble which is transmitted to the base station by the user equipment in a contention-based random access procedure.

6. The method of claim 1, wherein the plurality of cells belong to a single timing advance group (TAG).

7. The method of claim 1, further comprising:
transmitting a buffer status report (BSR) via the second PUSCH, the BSR indicating an uplink data buffer status of the user equipment.

8. The method of claim 1, wherein the first cell is a primary cell (Pcell) and the second cell is a secondary cell (Scell).

9. A user equipment configured to transmit uplink control information to a base station in a wireless communication system supporting carrier aggregation of a plurality of cells containing a first cell and a second cell, the user equipment comprising:
a transceiver configured to transmit and receive a signal; and
a processor operably connected to the transceiver and configured to:
control the transceiver to receive a random access response via a physical downlink shared channel (PDSCH) from a base station,
wherein the random access response schedules a first physical uplink shared channel (PUSCH) transmission on the first cell,
control the transceiver to receive downlink control information via a physical downlink control channel (PDCCH) from the base station,
wherein the downlink control information schedules a second PUSCH transmission on the second cell,
when the first PUSCH transmission and the second PUSCH transmission are configured in a same subframe, control the transceiver to transmit the uplink control information to the base station on the second cell via the second PUSCH,
wherein the first PUSCH transmission scheduled on the first cell is dropped.

10. The user equipment of claim 9, wherein when a sounding reference signal (SRS) transmission is configured in the subframe, a rate-matching is applied to the second PUSCH.

11. The user equipment of claim 9, wherein the uplink control information comprises channel state information (CSI), and the CSI comprises at least one of channel quality indication information, precoding matrix indication information, or rank indication information.

12. The user equipment of claim 9, wherein if a hybrid automatic repeat and request acknowledgement (HARQ-ACK) transmission is configured in the subframe and a simultaneous transmission of physical uplink control channel (PUCCH) and PUSCH is not configured in the subframe, the HARQ-ACK is transmitted via the second PUSCH, and
when the HARQ-ACK transmission is configured in the subframe and the simultaneous transmission of PUCCH and PUSCH is configured in the subframe, the HARQ-ACK is transmitted via a PUCCH on the first cell.

13. The user equipment of claim 9, wherein the random access response is received in response to a random access preamble which is transmitted to the base station by the user equipment in a contention-based random access procedure.

14. The user equipment of claim 9, wherein the plurality of cells belong to a single timing advance group (TAG).

15. The user equipment of claim 9, wherein a buffer status report (BSR) is transmitted via the second PUSCH, the BSR indicating an uplink data buffer status of the user equipment.

16. The user equipment of claim 9, wherein the first cell is a primary cell (Pcell) and the second cell is a secondary cell (Scell).

* * * * *